Jan. 10, 1939.  E. E. WATKINS  2,143,338

FLOWERPOT STAND

Filed Oct. 9, 1937

Inventor

Edgar E. Watkins.

By Lacey & Lacey

Attorneys

Patented Jan. 10, 1939

2,143,338

UNITED STATES PATENT OFFICE 2,143,338

FLOWERPOT STAND

Edgar E. Watkins, Mast Hope, Pa.

Application October 9, 1937, Serial No. 168,274

1 Claim. (Cl. 211—128)

This invention relates to an improved stand intended for use as a support for growing plants, and it is one object of the invention to provide a device of this character which will permit a number of potted plants to be supported in stepped relation to each other and very effectively displayed.

It is another object of the invention to provide a stand formed of sheet metal, thus providing a stand which will be strong and durable and of light weight.

Another object of the invention is to provide a stand including a plurality of trays or pans which will provide good support for the potted plants and also serve as containers for catching and holding water.

The invention is illustrated in the accompanying drawing, wherein—

Figure 1:
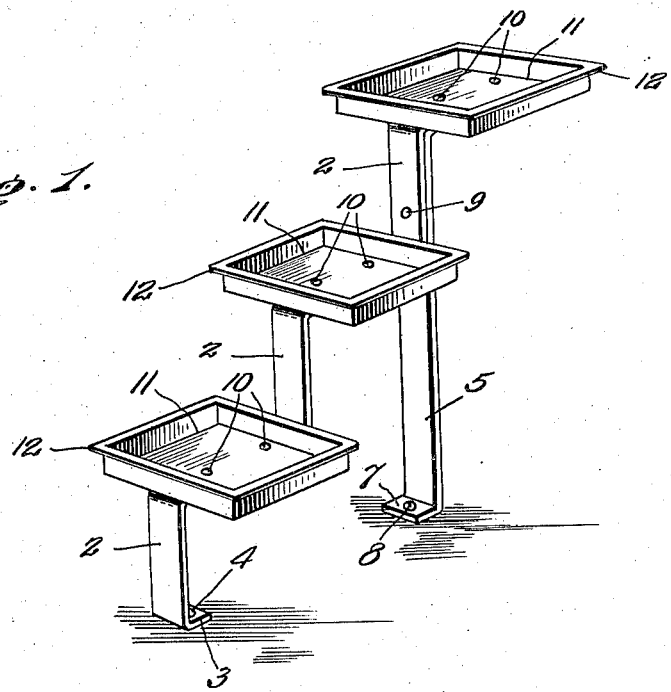
Figure 1 is a perspective view of the improved stand.
Figure 2:
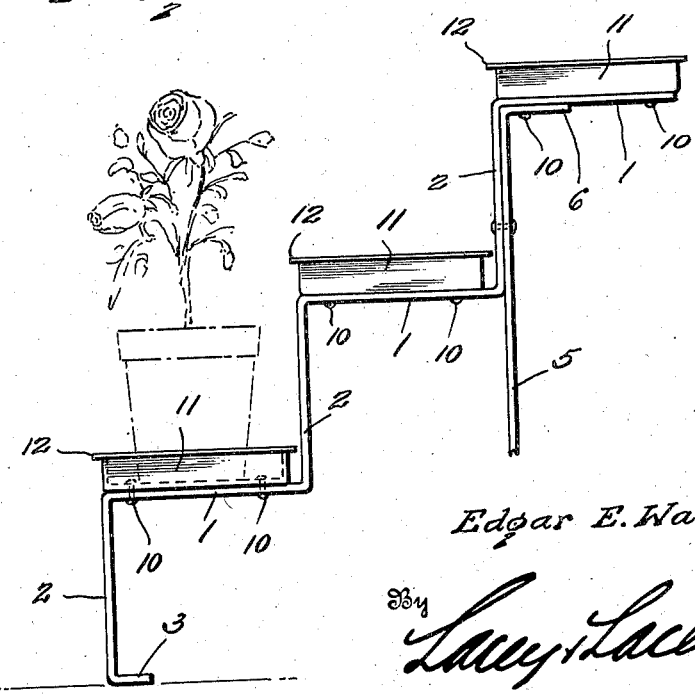
Figure 2 is a view showing the stand in side elevation and indicating by dotted line the manner in which a potted plant will be supported in one of the pans.

The body portion of this stand is formed from a strip of strong metal which is preferably one inch wide but may be of any width desired and is of such length that it may be bent to form a plurality of horizontally extending portions or steps 1 and vertically disposed uprights or risers 2. The lower riser or upright 2 has its lower end bent rearwardly to form a foot 3 having an opening 4 through which a screw or other fastener may be passed to secure the foot upon a supporting surface, such as a window sill. While the stand has been shown formed with three of the horizontally extending portions or steps 1, it is to be understood that any number of steps desired may be provided. The stand is to be supported in its upright position, and in order to do so, there has been provided a leg or prop 5 which is also formed from a strip of strong metal having its upper portion bent to form a rearwardly extending arm 6 and its lower end portion bent to form a forwardly extending foot 7 in which a fastener receiving opening 8 is formed. The leg or prop extends vertically back of the upper one of the risers 2 to which it is secured by a rivet or similar fastener 9, although it may be welded to this riser, and the arm at the upper end of the leg is secured against the under face of the upper step 1 by one of the fasteners 10 which serves to secure a pan 11 upon the upper step. Each of the steps carries one of the pans 11 which are preferably square and each pan is secured upon the step supporting the same by a pair of the rivets 10. In view of the fact that the pans are riveted to the steps of the stand, they will be firmly held in place and prevented from tilting transversely and allowing a pan to fall when plants are set in place, as indicated by dotted lines in Figure 2.

When this stand is in use, it is set in place upon a window sill or other support where it is firmly secured by fasteners passed through the openings 4 and 8. Potted plants are then set in place within the pans 11 and since the pans are mounted upon the steps of the stand, the plants will be supported in stepped formation and provide an attractive appearance. As each of the pans is formed about upper edges of its walls with an outstanding flange 12, they will be reinforced and prevented from splitting. The pans not only support the potted plants but also serve to hold water. Since the body portion and the top of the stand are formed from strips of strong sheet metal, the stand will be of light weight and capable of being manufactured at a small cost and sold at a reasonable price.

Having thus described the invention, what is claimed as new is:

A stand of the character described comprising a body formed from a single strip of metal of appreciably greater width than thickness, said strip being bent at points spaced from each other longitudinally thereof to provide a plurality of steps having horizontally extending treads and vertically disposed risers, the lower riser having its lower end portion bent in spaced relation to its end to form a horizontal support-engaging foot, a leg consisting of a single strip of metal disposed vertically and secured against the rear face of the upper riser, said leg having its lower end portion bent in spaced relation to its lower end to form a horizontally extending support-engaging foot and its upper end portion bent in spaced relation to its upper end to form a rearwardly extending horizontal arm disposed against the under face of the uppermost tread of the stand, pans resting upon the treads and projecting from opposite side edges thereof, and fasteners passing through the pans and treads, one of the fasteners for the upper pan passing through the arm at the upper end of the supporting leg to secure the arm against the tread.

EDGAR E. WATKINS.